United States Patent
Bentley et al.

(10) Patent No.: US 8,381,176 B1
(45) Date of Patent: Feb. 19, 2013

(54) SOFTWARE BUILD ORCHESTRATION FRAMEWORK

(75) Inventors: Keith A. Bentley, Elverson, PA (US);
Eric C. Wyler, Pottstown, PA (US);
Ezra W. Smith, Exton, PA (US);
Charles F. Kirschman, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 423 days.

(21) Appl. No.: 12/796,316

(22) Filed: Jun. 8, 2010

(51) Int. Cl.
*G06F 9/44* (2006.01)

(52) U.S. Cl. .......................... 717/107; 717/106

(58) Field of Classification Search .......... 717/106–109, 717/120–123
See application file for complete search history.

(56) References Cited

U.S. PATENT DOCUMENTS

| | | | |
|---|---|---|---|
| 6,028,998 A | 2/2000 | Gloudeman et al. | |
| 6,167,563 A | 12/2000 | Fontana et al. | |
| 6,298,476 B1 | 10/2001 | Misheski et al. | |
| 7,003,759 B2 | 2/2006 | Jameson | |
| 7,640,533 B1 * | 12/2009 | Lottero et al. | 717/108 |
| 8,037,453 B1 * | 10/2011 | Zawadzki | 717/123 |
| 2011/0239195 A1 * | 9/2011 | Lin et al. | 717/126 |

OTHER PUBLICATIONS

Greenfield et al., "Software Factories Assembling Applications with Patterns, Models, Frameworks and Tools," Oct. 2003, ACM, p. 16-27.*
Excerpts from "Microsoft Visual Studio Online Manual," http"//msdn.microsoft.com/en-us/library/, Jun. 8, 2010, pp. 1-48.

* cited by examiner

*Primary Examiner* — Wei Zhen
*Assistant Examiner* — Qing Chen
(74) *Attorney, Agent, or Firm* — Cesari and McKenna, LLP

(57) ABSTRACT

In one embodiment, a build orchestration framework orchestrates building of one or more individual buildable components of a deliverable software product. At least some buildable components reference respective sub components on which they depend. Building creates a structure associated with each respective buildable component of the one or more buildable components. In this structure, if the respective buildable component references a sub component on which the respective buildable component depends, a symbolic link is created to an output of a build of the sub component to provide access to the output of the sub component for use in building the respective buildable component. Further, in this structure, if the respective buildable component is used by another buildable component, a symbolic link is created to an output of a build of the respective buildable component.

20 Claims, 9 Drawing Sheets

SOFTWARE BUILD ORCHESTRATION FRAMEWORK

BACKGROUND

1. Technical Field

The present disclosure relates generally to the process of building software on computer systems and more specifically to techniques for managing build dependencies among software modules to produce reproducible builds.

2. Background Information

In a large scale software development, it is often desirable to create reusable software modules that solve general purpose problems, and then combine these software modules in various forms, to create different deliverable software products. Individual developers, or teams of developers, may each write source code for different software modules. Such source code may be written in high-level programming languages (such as C or Java™), in scripting or dynamic languages (such as Perl or Python), and/or in low-level languages (such as assembly code). Typically the source code is stored in one or more source files held and versioned in a source code management (SCM) system. A SCM system may provide helpful management of source code, for example, managing who is allowed to make changes to the source code, providing the ability to document and annotate changes, providing the ability to roll-back to previous versions if changes are not successful, as well as providing other useful functionality.

A developer may periodically "build" the software module(s) he or she is working on from the source files maintained in the SCM, for example, at completion of coding or at an interim point for testing purposes. Building software typically involves processing of source files containing source code, and possibly other files such as previously built files, libraries and/or data files, using one or more software development tools, e.g., a build tool, a compiler, and/or a linker, to create deliverable software that may be used by others. During building, at least some portions of the source code may be converted into executable code.

A variety of challenges are faced when attempting to build software, even when only an individual software module is being built. For example, even when building an individual software module, a developer must deal with "build dependencies". Typically, certain portions of software should be built in a certain order, such that some portions of the software should be already present (e.g., already built) before other portions may be built.

Some build dependencies are quite simple. Other build dependencies are far more complex, and may involve inter-dependencies created by references in a first source file to individual classes, methods, functions, and/or data found in other source files. These complex build dependencies may be expressed in a build-order dependency graph, having nodes and directed acyclic links that represent dependencies between source code modules.

A build tool may be employed by developers to manage the building of an individual software module. A build-order dependency graph is typically provided to a build tool as an implicit representation, for example, in one or more Makefiles or solution files that define a file (or set of files) or a rule name as depending on a set of files, in build commands that specify a build ordering (e.g., "BeforeBuild" and "AfterBuild" in Microsoft Visual Studio™ development environments "solution" files), and/or in batch files that specify a build order.

While these solutions may be sufficient when individual developers are attempting to build individual software modules, they suffer a number of shortcomings when applied to a large scale software development, wherein many reusable software modules are often combined in various forms to create different deliverable software products. Individual software developers often attempt to control the building process for the individual software modules they create, as if those modules had no external dependencies. That is, individual software developers often tend to concentrate solely on the sub-graph of the build-order dependency graph related to their particular software modules. This often creates a hard-to-manage implementation, where Makefiles, solution files, build commands, and/or batch files for individual software modules attempt to control the entire building process for the overall software product. This approach may lead to sometimes hard to locate inconsistencies and errors.

Even if an individual developer tries to properly consider external dependencies, with conventional tools, it may be quite difficult. As discussed above, such dependencies may be expressed implicitly, rather than explicitly, in Makefiles, solution files, build commands, and/or batch files. This obfuscation makes the handling of external dependencies quite difficult.

Further, enforcing standards for interaction between individual software modules during a build in a large scale software development is often problematic, since individual software modules may be built using different software development tools, versions of software development tools, etc.

Finally, conventional tools often fail to allow incorporation in a current build of previously-built "last known good" builds of individual software modules that have not changed. As a result, resources may be wasted rebuilding software modules that have not changed.

Accordingly, there is a need for improved techniques for orchestrating building of software modules to create deliverable software products, including techniques for managing build dependencies among software modules that may be created by different software developers.

SUMMARY

In one embodiment, a build orchestration framework manages the building of a plurality of buildable components (e.g., Build Parts) of a deliverable software product, handling build dependencies by creating one or more structures (e.g., Build Contexts) that include symbolic links that chain the "outputs" of respective sub components (e.g., Build Sub Parts) to the "inputs" of buildable components (e.g., Build Parts) that depend on them.

Each buildable component (e.g., Build Part) and sub component (e.g., Build Sub Part) is related to a particular software module. A software developer first selects one or more collections of information (e.g., Build Strategies) that control how the individual buildable components are to be processed in building the software product. A build orchestration process may then be used to retrieve (i.e., "pull") source code and/or last known good builds of the buildable components. The build orchestration process may then proceed to build buildable components, using embedded build commands that activate Makefiles associated with each buildable component.

To facilitate a build, the build orchestration process creates a structure (e.g., Build Contexts) for each buildable component (e.g., Build Part). When a build command for a buildable component is triggered, a Makefile is launched and the buildable component is built to create outputs. A symbolic link to the outputs as specified in binding statements of the buildable component are written to the structure (e.g., to the Build Context). If a buildable component (e.g., Build Part) is dependent on any sub components (e.g., Build Sub Parts), these sub components are built first, recursively, and the build orchestration process creates a symbolic link for the bindings of the sub component, and all of it's sub components recursively, into the structure (e.g., Build Context) for the buildable component (e.g., Build Part) before building the buildable component itself. With such symbolic links in its structure (e.g., Build Context), the buildable component (e.g., Build Part) need only look to its own structure (e.g., Build Context) for files on which it depends. After a build is complete, the build orchestration process 140 may be used to post (i.e., "push") software to a repository or set of repositories Such a build orchestration framework may enable more efficient and reliable building of software than typically achievable with conventional techniques.

BRIEF DESCRIPTION OF THE DRAWINGS

The description below refers to the accompanying drawings of example embodiments, of which.

DETAILED DESCRIPTION

I. Definition of Terms

As used herein, "source code" shall be understood to refer to a collection of statements or declarations written in a human-readable computer programming language, for example C, C++, C#, Java™, etc. Source code may, but need not, be stored in source files.

As used herein, the term "building" shall be understood to refer to the processing of source code, and possibly other information, such as prebuilt files, libraries and/or data files, using one or more software development tools (e.g., a build tool, a compiler, and/or a linker) to create deliverable software modules that may be used by others.

As used herein, the term "building dependency" shall be understood to refer to a requirement that certain portions of software should be built in a certain order, such that some portions of the software should be already present (e.g., already built) when another portion is being built.

As used herein, the term "Build Part" shall be understood to refer to a specification of an individual buildable component of a building process, which may be incorporated into a deliverable software product. One example of a Build Part is a specification of a buildable component that corresponds to a dynamically linked library (".dll") file.

As used herein, the term "Build Sub Part" shall be understood to refer to a Build Part upon which a particular other Build Part depends.

As used herein, the term "Build Context" shall be understood to refer to a structure that contains symbolic links to the "output" of Build Parts, for example, so that they can be used as an "input" of another Build Part.

As used herein, the term "Makefile" shall be understood to refer to a file or a plurality of files that specify a procedure to build code and possibly other information. For example, a Makefile may be the input to a Unix-style "make" utility (e.g. "nmake"). Alternatively, a "Makefile" can be a Visual Studio solution file, a batch file, or some other high-level description of the process that builds a Build Part.

As used herein, the term "Build Strategy" shall be understood to refer to a collection of information that controls how one or more Build Parts are processed in building software. A Build Strategy may, but need not, take the form of one or more of XML files.

As used herein, a "Remote Repository" shall be understood to refer to a receptacle that stores a high level copy of source code and/or last known good builds for software modules from which working copies may be retrieved and updated software may be posted. A Remote Repository may, but need not, be located physically remote from the working copies and/or the computer used by a software developer.

As used herein, a "Local Repository" shall be understood to refer to a receptacle for a working copy of source files and/or last known good builds of software modules. A Local Repository may, but need not, be located physically local to (e.g., on the computer used by) a software developer.

II. Example Embodiments

Figure 1:
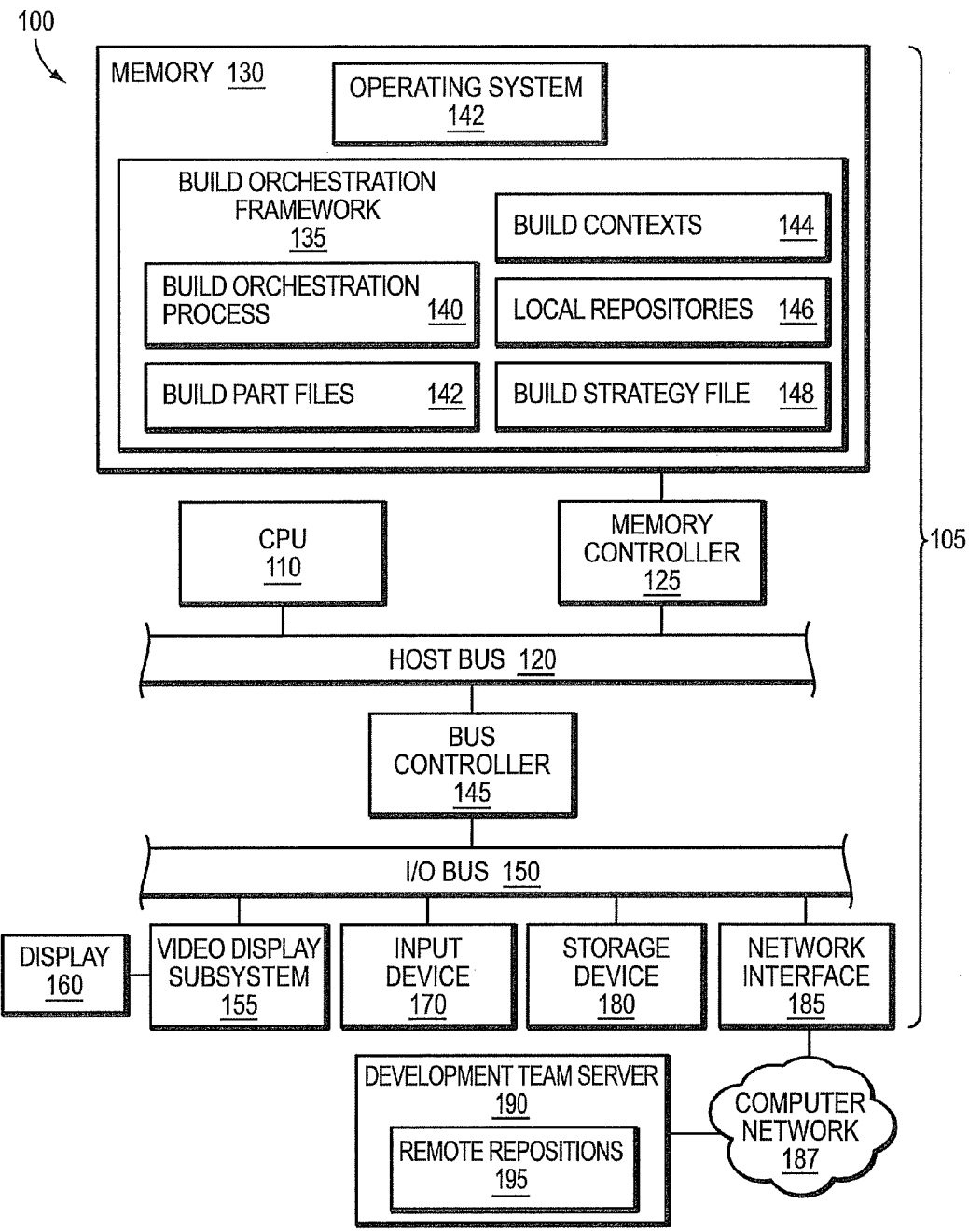
FIG. 1 is a schematic block diagram of a computer system including an example computer (e.g., the desktop computer of an individual software developer) interconnected to a development team server, in which at least some of the presently described techniques may be employed.

FIG. 1 is a schematic block diagram of a computer system 100 including an example computer 105 (e.g., the desktop computer of an individual software developer) interconnected to a development team server 190, in which at least some of the presently described techniques may be employed. The computer 105 includes at least one central processing unit (CPU) 110 coupled to a host bus 120. The CPU 110 may be any of a variety of commercially available processors, such as an Intel x86/x64 processor, or another type of processor. A volatile memory 130, such as a Random Access Memory (RAM), is coupled to the host bus 120 via a memory controller 125. The memory 130 is adapted to store at least a portion of an operating system 132 while the computer 105 is operating.

In addition, the memory 130 may store portions of other software, including a software build orchestration framework 135. The software build orchestration framework 135 may include a build orchestration process 140 that initiates various stages of a build, one or more Build Part files 142 that include one or more Build Parts that specify is individual buildable components that may be incorporated into a deliverable software product, one or more Build Contexts 144 created from corresponding Build Part files 142 and containing symbolic links, and a Local Repositories 146 that hold local working copies of source files and/or last known good builds of software modules. Further, the build orchestration framework 135 may include one or more Build Strategy files 148 including Build Strategies that control how Build Parts are processed in building. As explained further below, the build orchestration process 140, in conjunction with the one or more Build Part files 142, the one or more Build Contexts 144, and the one or more Build Strategy files 148, may work together to orchestrate building of deliverable software products, including the managing of build dependencies among individual buildable components.

The host bus 120 of the computer 105 is coupled to an input/output (I/O) bus 150 through a bus controller 145. A video display subsystem 155, coupled to a display screen 160, is coupled to the I/O bus 150. The display screen 160 may show a user interface of the build orchestration framework 135, for example, a text-based user interface such as a command line, or a graphical user interface. One or more input devices 170, such as a keyboard, a mouse, etc., are provided and used for interaction with the computer 105, and the build orchestration framework 135. A persistent storage device 180, such as hard disk drive, a solid-state drive, or other type or persistent data store, is coupled to the I/O bus 150, and may persistently store data, including computer-executable instructions. Persistently stored data may be loaded to the volatile memory 130 when needed. For example, computer-executable instructions related to the operating system 135, and the build orchestration framework 135 and its constituent part may be stored in the persistent storage device 180 until they are needed.

The I/O bus 150 may further be coupled to a network interface 185 that interfaces via a computer network 187 with one or more development team servers 190. Each development team server 190 may include components similar to computer 105 (not shown) to provide a platform that supports Remote Repositories 195 accessible to a plurality of software developers (e.g., each using a different computer). The Remote Repositories 195 maintains a high level copy of source files and/or last known good builds of software modules from which working copies to populate the Local Repositories 146 on the computer 105 may be retrieved (i.e., pulled). The local copies may be changed and updated, and updated software may be posted (i.e., pushed) back to the Remote Repositories 195. While the Remote Repositories 195 are shown resident on a development team server 190, in alternative embodiments, the Remote Repositories 195 may be differently located, and need not be on a physically remote platform. For example, some or all of the Remote Repositories 195 could be located on the computer 105.

In general, it should be understood that the arrangement of computing platforms depicted in FIG. 1 is merely an example of one possible configuration, and that a wide variety of parallel, distributed, virtualized and other computing systems may alternatively be employed, wherein the build orchestration framework 135, the build orchestration process 140, the one or more Build Part files 142, the one or more Build Contexts 144, the one or more Build Strategy files 148, the Local Repositories 146, and the Remote Repositories 195, may arranged on, or distributed between, various computers in a variety of manners.

According to one embodiment of the present disclosure, the software build orchestration framework 135 may be employed to orchestrate the building of Build Parts to create deliverable software products. A software developer may first select appropriate Build Strategies, for example, by creating and/or selecting already created Build Strategy files 148. The build orchestration process 140 may then be used to retrieve (i.e., "pull") source code and/or last known good builds of Build Parts, according to the Build Strategies, for example, from the Remote Repositories 195. The Build Strategies indicate particular Build Parts from Build Part files 142 that should be built, and how they should be built. The build orchestration process 140 may then be used to build the particular Build Parts indicated by the Build Strategies, according to embedded build commands that activate Makefiles associated with the Build Parts.

To facilitate a build, the build orchestration process 140 creates symbolic links in the Build Context 144 for each Build Part. An example embodiment of a Build Context would be a directory on a computer disk. When a build command for a Build Part is triggered, a Makefile is launched and the Build Part is built to create outputs. As part of the Makefile processing, symbolic links to the outputs, matching specifications of the binding statements of the Build Part, are created in the Build Part's Build Context. If the Build Part is dependent on any Build Sub Parts, the build orchestration process 140 builds these Build Sub Parts first and creates symbolic links, from the bindings of the Build Sub Parts into the Build Part's Build Context, prior to building the Build Part. With such symbolic links in its Build Context, every Build Part need only look to its own Build Context for everything upon which it depends. The use of symbolic links in the Build Contexts may effectively chain the "outputs" of Build Sub Parts to the "inputs" of other Build Parts that depend on them, to enable a more efficient and reliable builds than typically achievable with conventional techniques. After a build is complete, the build orchestration process 140 may be used to post (i.e., "push) built software to a repository.

Figure 2:
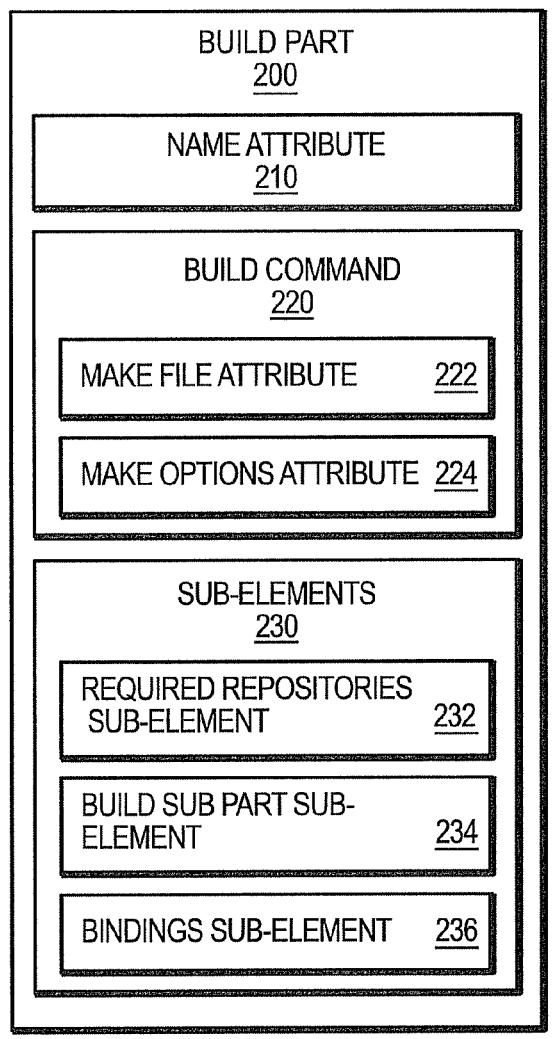
FIG. 2 is a schematic block diagram of an example Build Part that specifies an individual buildable component that may be incorporated into a deliverable software product.

FIG. 2 is a schematic block diagram of an example Build Part 200 that specifies an individual buildable component that may be incorporated into a deliverable software product. Build Parts often correspond to dynamically linked library (".dll") files. However, it should be understood that there are many other types of buildable components to which a Build Part may correspond. In one embodiment, Build Parts are described by Extensible Markup Language (XML) elements within Build Part files 142. Build Part files 142 may include many different Build Part elements. However, it should be understood that in other embodiments Build Parts may be described using different structures and examined in different orderings and manners.

The example Build Part 200 includes a name attribute 210 to uniquely identify the Build Part. Further, the Build Part 200 includes a build command 220 that indicates how the Build Part is built. For example, the build command 220 may indicate the name of an application or file that builds the Build Part 200 and configuration options for that application or file. While the build command 220 may take different forms depending on the particular embodiment, in one embodiment, the build command 220 is composed of a Makefile attribute 222 that specifies a path to a Makefile, and a make options attribute 224 that specifies configuration options for that Makefile.

The Build Part 200 further may include a set of sub elements 230. A required repository sub-element 232 indicates repositories that should have a Local Repository present for the build command 220 to be executed. A Build Sub Part sub-element 234 indicates other Build Parts upon which the Build Part 200 depends. For example, a Build Sub Part sub-element 234 may reference a particular other Build Part whose "output" should be present when the Build Part 200 is being built. Each Build Sub Part element 234 may have its own attributes (not shown), for example, a name attribute indicating the Build Sub Part's name, a file attribute indicating a Build Part file 142 where the Build Sub Part can be found, a repository attribute that specifies which repository contains the Build Part file, etc. Finally, a Bindings sub-element 236 indicates "outputs", e.g. one or more files, such as .dll files, .lib files, etc. that are produced by the Build Part 200.

Figure 3:
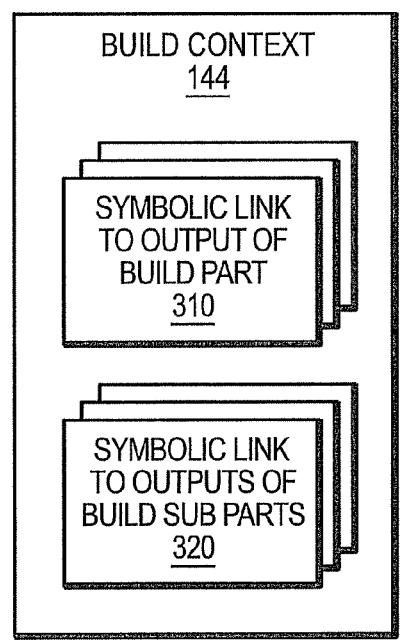
FIG. 3 is a schematic block diagram of an example Build Context that contains one or more links (e.g., symbolic links) that inter-connect Build Parts.

FIG. 3 is a schematic block diagram of an example Build Context 144 that contains one or more symbolic links. The Build Context 144 facilitates the exchange of information (e.g., files) from Build Sub Parts to Build Parts, providing a known and stable location to find information (e.g., files) created by Build Sub Parts used by a Build Part (a Build Part's "inputs") and a window through which information (e.g., files) created by the Build Part are made available to other Build Parts (a Build Part's "outputs"). In effect. a Build Context 144 may be used to chain "outputs" to "input" to enable the building process. In one embodiment, the Build Context 144 is structured as a directory and constructed from a corresponding Build Part file 142, such that there is a one-to-one relationship between Build Part files and Build Contexts. The Build Part files and the corresponding Build Contexts may share at least a portion of the same name. Typically, all Build Parts in a particular Build Part file 142 share the same Build Context 144. However, it should be understood that other arrangements may be used in alternative embodiments. Further, Build Contexts are generally persistent, and typically can be repeatedly used throughout a building process and/or in multiple invocations of the building processes. Use of persistent Build Contexts may have significant advantage over previous approaches that have relied upon, for example, transitory environment variable and other structures that generally "vanish" after sub-portions of a build are complete.

As discussed above, Build Context 144 typically contains one or more symbolic links. A symbolic link is a special type of file that contains a reference to another file or directory in the form of an absolute or relative path that affects pathname resolution. Operations on symbolic links generally behave as if operating directly on the target directory or target file. In one embodiment, Build Context 144 includes two general types of symbolic links. A first type of symbolic link is a symbolic link 310 to an output of the Build Part itself. For example, when the build orchestration process 140 calls the Makefile associated with the Build Part to build the Build Part, and produce outputs (e.g., a .dll and a .lib file), a symbolic link to an output (e.g., the .lib file) referenced by a bindings statement in the Build Part may be created in the corresponding Build Context 144.

A second type of symbolic link is a symbolic link 320 to an output of a Build Sub Parts upon which the Build Part depends. For example, the build orchestration process 140 may see that the Build Part depends on a particular Build Sub Part, so the build orchestration process 140 creates a symbolic link to an output (e.g., a .lib file) indicated in the bindings statement of the particular Build Sub Part in the Build Context 144 of the Build Part. This is typically done before calling the Makefile associated with the Build Part. Thereby, when the Makefile is called, and the Build Part is built, the Makefile for the Build Part need look only to the Build Context 144 of the Build Part for necessary files, and not directly into the source or output trees of any Build Sub Parts of the Build Part.

Figure 4:
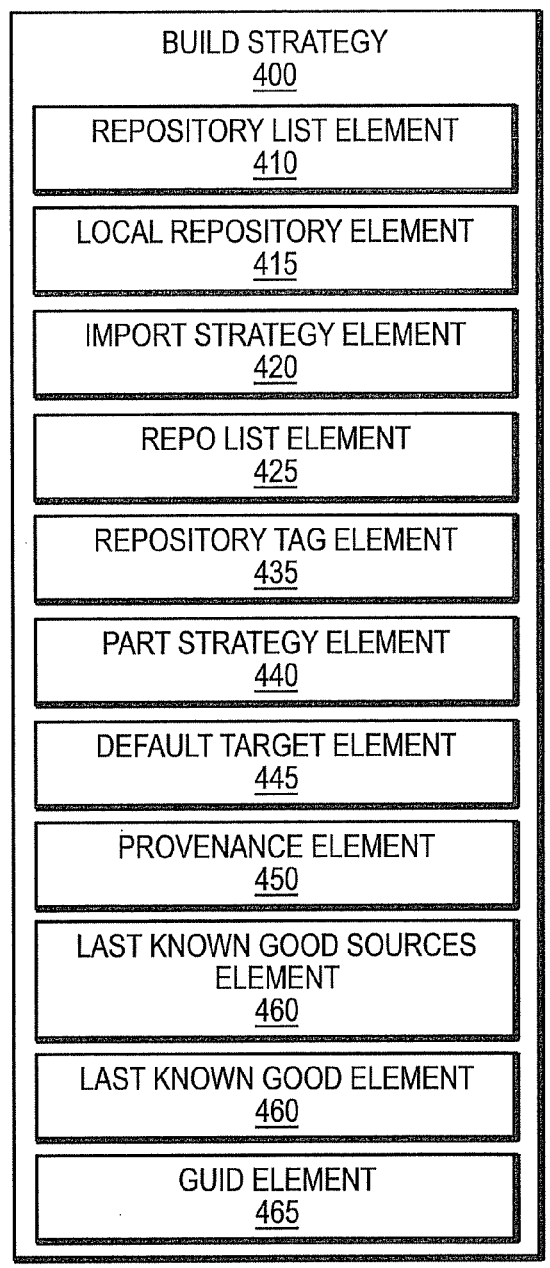
FIG. 4 is a schematic block diagram of an example Build Strategy that includes information that controls how one or more Build Parts are processed in a building process.

FIG. 4 is a schematic block diagram of an example Build Strategy 400 that includes information that controls how one or more Build Parts are processed in a building process. A Build Strategy may include information specifying where to find certain files, for example, where to find Remote Repositories 195, Local Repositories 146, and/or last known good builds. Further, a Build Strategy may include indications of how to conduct the build, including what source files and/or last known good builds to retrieve (i.e., "pull"), what Build Parts should be built, and what should be done if a build of a particular Build Part fails.

Build Strategies may be maintained in Build Strategy files 148, for example XML files, that are accessed by the build orchestration process 140 when it is executed. Build Strategy files 148 are typically processed by the build orchestration process 140 linearly, e.g., top-to bottom. A value specified later in a Build Strategy file may override a previous value. Further, a Build Strategy in a Build Strategy file 148 may "import" another Build Strategy (e.g., another Build Strategy file). Importing a Build Strategy has the same result as copying the entire imported Build Strategy into the present Build Strategy. In this manner, one Build Strategy can "build on" another Build Strategy, initially setting parameters according to the imported Build Strategy and then overriding at least some parameters with later-specified values presented in the present Build Strategy file.

The example Build Strategies 400 may include a Remote Repository list element 410 that specifies Remote Repositories, a Local Repository element 415 that indicates Local Repositories 146, an import strategy element 420 that, as discussed above, can be used to specify one or more other Build Strategies to import. Further, the example Build Strategy 400 may include a repository strategy element 435 that indicates a strategy to use with one or more Remote Repositories, and a part strategy element 440 that indicates a strategy to use for one or more Build Parts. The example Build Strategies 400 may also include a default target element 445 that indicates a default Build Part to use as a starting point, and a provenance element 450 that indicates an action to take if a provenance error (e.g., an inconsistency between the versions of Remote Repositories) is detected. Finally, the example Build Strategy 400 may include a last known good sources element 455 that indicates a name given to a set of last known good builds of certain Build Parts as well as an address of the where the last known good builds of certain Build Parts can be found and a type of delivery technique for such last known good builds. The last known good sources element 455 is typically used in conjunction with a last known good element 460 that references the last known good sources element 455 by name and specifies where to store last known good builds locally. It should be understood that in alternative embodiments a wide variety of other elements may be used in a Build Strategy 400, in addition to, or rather than, one or more of the above described elements.

Figure 5:
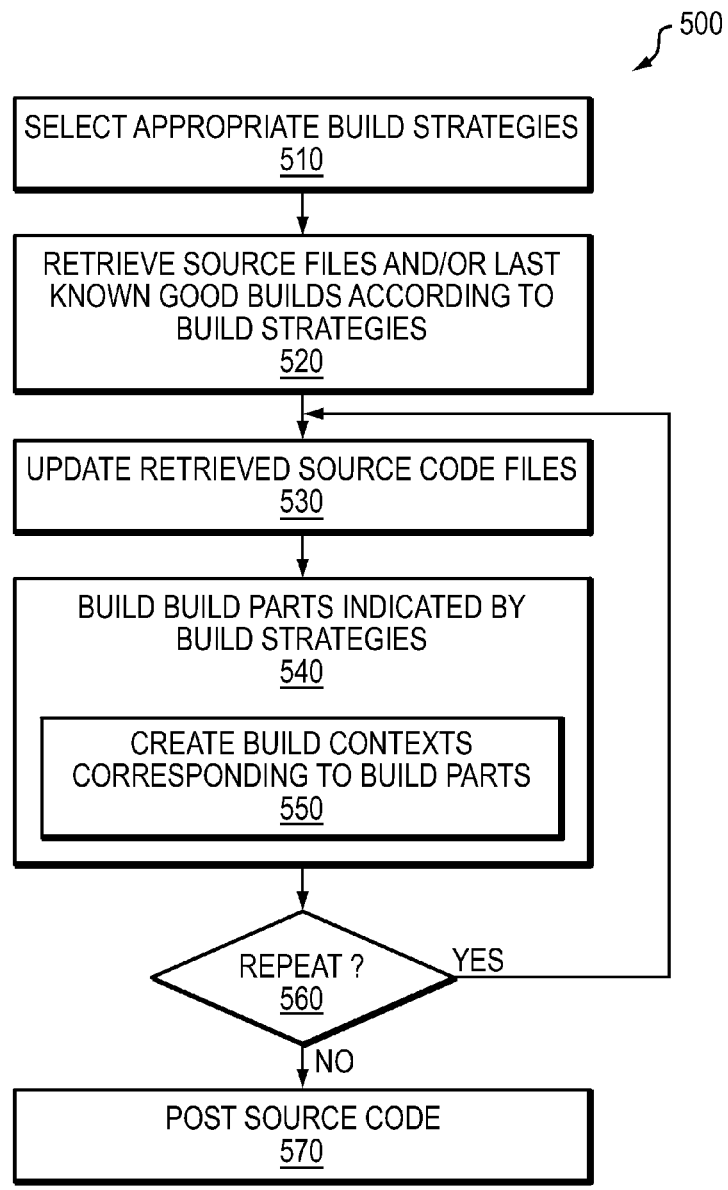
FIG. 5 is a flow chart of an example sequence of steps for building one or more software modules from Build Parts using the build orchestration framework described herein.

FIG. 5 is a flow chart of an example sequence of steps 500 for building one or more software modules from Build Parts using the build orchestration framework described herein. The sequence 500 beings at step 510, where a software developer selects appropriate Build Strategies 400, for example, by creating and/or selecting already created Build Strategy files 148. Next, at step 520, the build orchestration process 140 is is executed and to retrieve (i.e., "pull") source files and/or last known good builds of Build Parts, according to the Build Strategies from one or more repositories, for example, for the Remote Repositories 195. At step 530, a software developer may update or otherwise change one or more of the retrieved source code files. At step 540, the build orchestration process 140 is further used to build the particular Build Parts indicated by the Build Strategies, using embedded build commands that activate Makefiles associated with the Build Parts. As part of building the particular Build Parts, at step 550, Build Contexts corresponding to the respective Build Parts are created and populated with symbolic links to the output of the respective Build Part when built, according to a bindings statement in the Build Part, and in some cases to an output of Build Sub Parts upon which the respects tive Build Part depends, according to binding statements in the Build Sub Parts. If desirable, steps 530 and 540 may be repeated by decision step 560, such that a software developer may further update or otherwise change retrieved source code files and again build the particular Build Parts indicated by the Build Strategies. Finally, at step 570, the build orchestration process 140 is used to post (i.e., "push) the updated source code to one or more repositories, for example, to the Remote Repositories 195. Such source code may then be used by others for further development and/or incorporated into a deliverable software product.

Figure 6A:
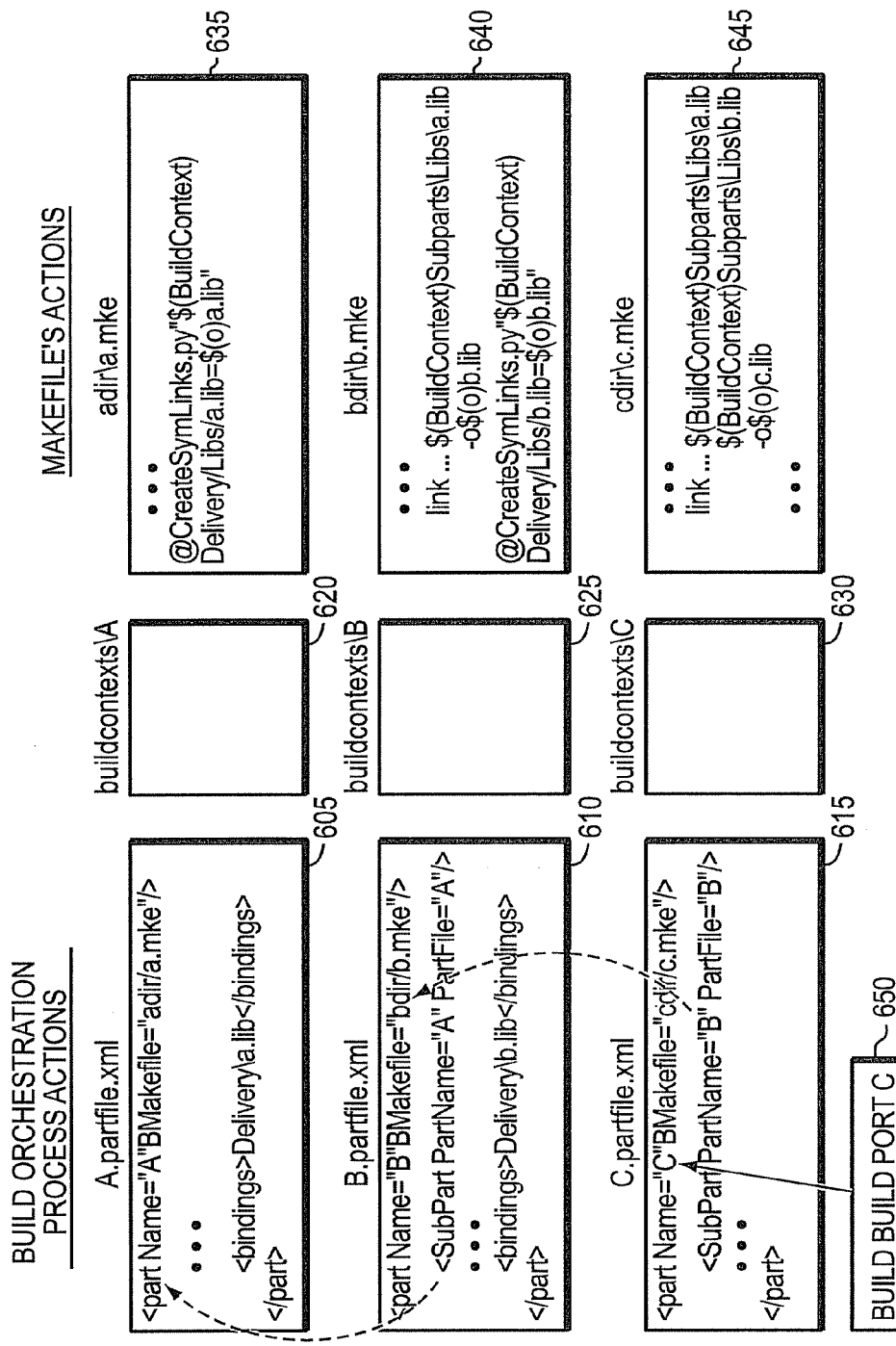
FIGS. 6A-6D are illustrations of an example usage of Build Contexts in building particular Build Parts having certain build dependencies, that may illustrate some of the is novel techniques described herein.

FIGS. 6A-6D are illustrations of an example usage of Build Contexts in building particular Build Parts having certain build dependencies, that may illustrate some of the novel techniques described above. Consider an example with three Build Parts (Build Parts A, Build Parts B and Build Parts C) having respective Build Part File A 605, Build Part File B 610, and Build Part File C 615. In this example, Build Part C depends on Build Part B, and Build Part B in turn depends on Build Part A. Suppose a software developer desires to build Build Part C. As shown in FIG. 6A, when directed to build Build Part C (at operation 650), the build orchestration process 140 examines Build Part File C and determines that Build Part C depends on Build Part B, recognizing a reference to a Build Sub Part B in Build Part C. The build orchestration process 140 next examines Build Part File B and determines Build Part B, in turn, depends on Build Part A, again from a reference to a Build Sub Part A in the Build Part B. The build orchestration process 140 sees no reference to a Build Sub Part in Build Part File A, so it determines Build Part A does not depend on any other Build Parts. From these dependencies, the build orchestration process 140 concludes to build Build Part A first, then to build Build Part B, and finally to build Build Part C.

Figure 6B:
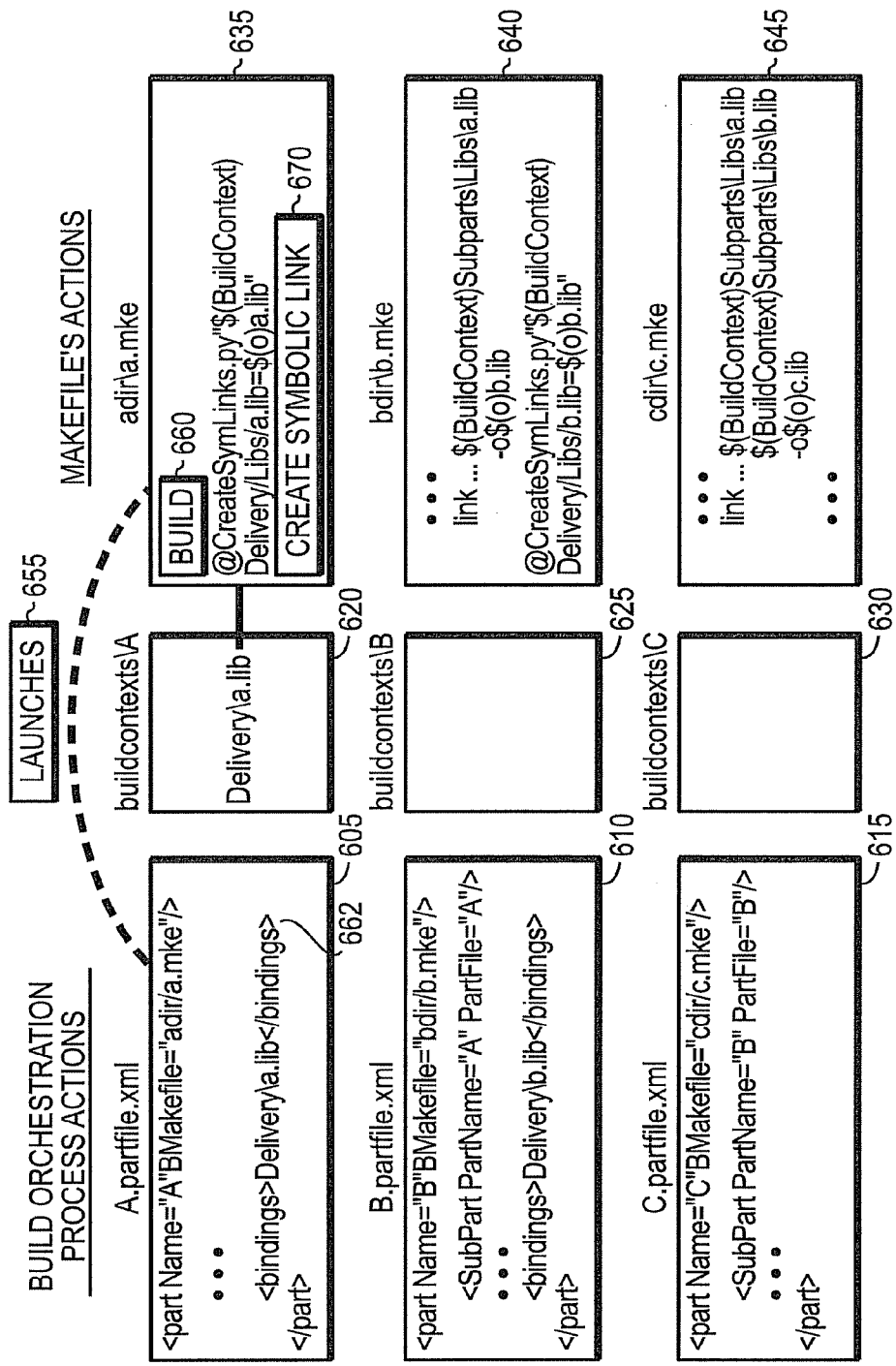

Next, as shown in FIG. 6B, the build orchestration process 140 launches (at operation 655) the Makefile for Build Part A, according to the embedded build commands in Build Part File A. The Makefile for Build Part A (at operation 660) builds outputs of Build Part A, specifically the file "a.lib." Then, the Makefile for Build Part A creates a symbolic link to "a.lib" (at operation 670) in the Build Context 620 for Build Part A (hereinafter "Build Context A 620) so it can be found by the bindings statement 662 of Build Part A.

Figure 6C:
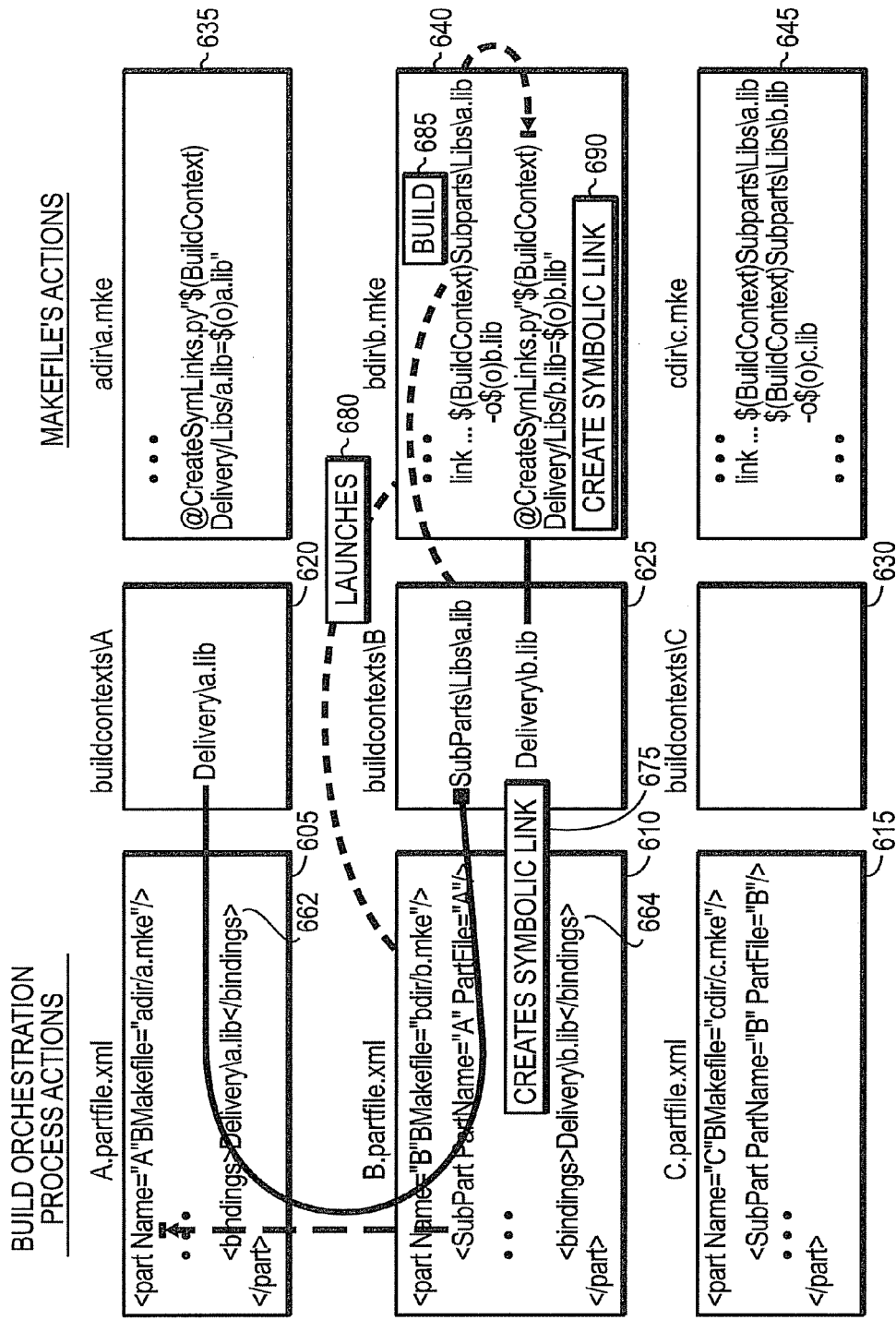

Next, as shown in FIG. 6C, the build orchestration process 140 prepares to build Build Part B. However, the build orchestration process 140, having recognized that Build Part B depends on Build Part A, first creates a symbolic link (at operation 675) to "a.lib", as defined by Build Part A's binding statement 662, in the Build Context 625 of Build Part B (hereinafter "Build Context B 625"). The build orchestration process 140 then launches (at operation 680) the Makefile for Build Part B, according to the embedded build commands in Build Part File B. The Makefile for Build Part B (at operation 685) builds outputs of Build Part B, for example the files "b.dll" and "b.lib." The Makefile for Build Part B looks only to Build Context B 625 for needed files (e.g. "a.lib"), and not directly into the source or output trees of any Build Sub Parts of Build Part B, e.g. not directly to the source or output tree of Build Part A. Subsequent to or concurrently with the building, the Makefile for Build Part B creates a symbolic link (at operation 690) to its output "b.lib", so it can be found by the bindings statement 664 of Build Part File B, in Build Context B 625.

Figure 6D:
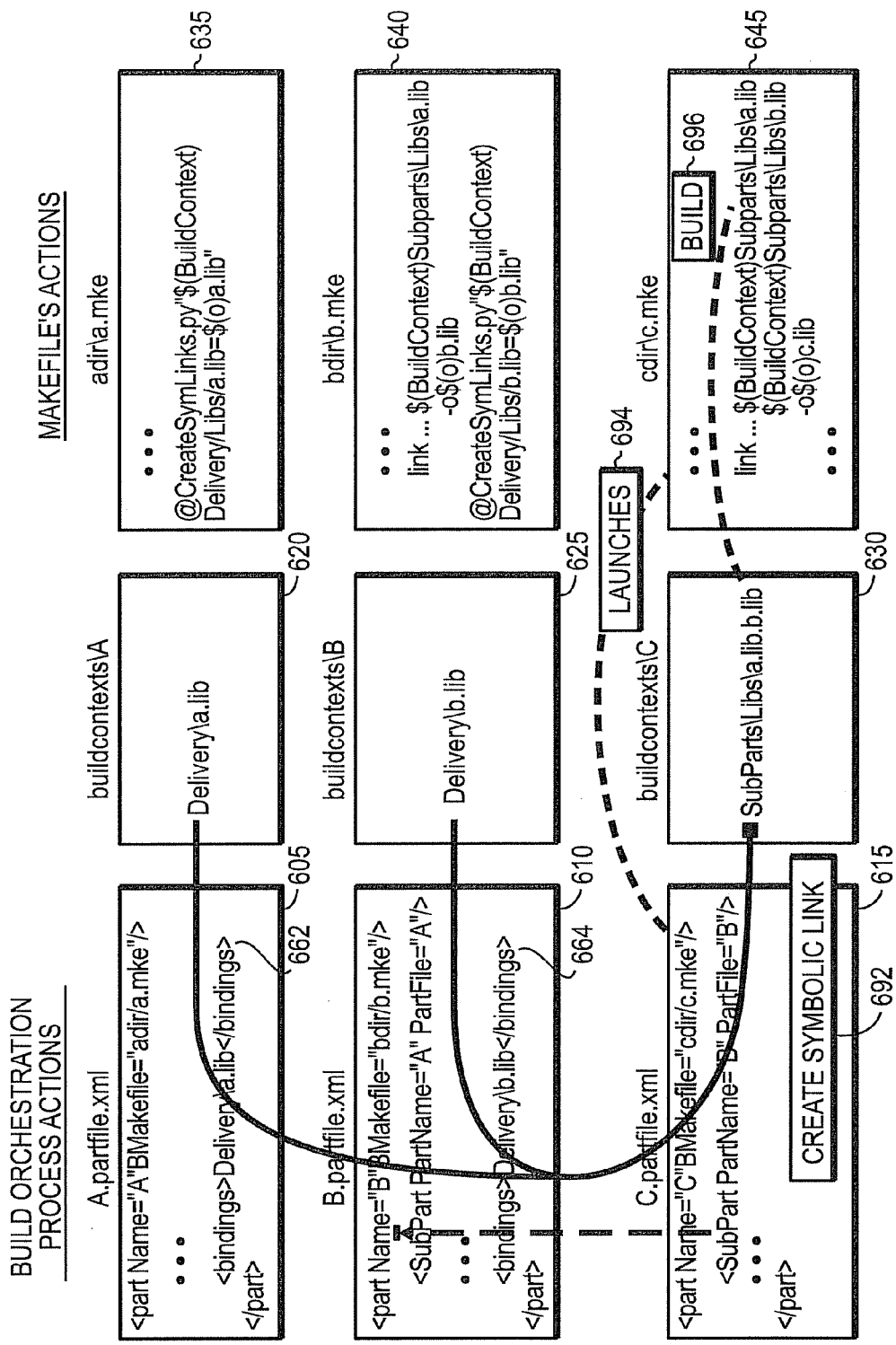

Finally, as shown in FIG. 6D, the build orchestration process 140 prepares to build Build Part C. The build orchestration process 140, having recognized that Build Part C depends on Build Part B, which in turn depends on Build Part A, first creates symbolic links (at operation 692) to "a.lib" and "b.lib", as defined in the bindings statements 662 of Build Part A and 664 of Build Part B, in the Build Context 630 of Build is Part C (hereinafter "Build Context C 630"). The build orchestration process 140 then launches (at operation 694) the Makefile for Build Part C, according to the embedded build commands in Build Part File C. The Makefile for Build Part C (at operation 696) builds outputs of Build Part C, for example the files "c.dll" and "c.lib." The Makefile for Build Part C looks only to Build Context C 630 for needed files, and not directly into the source or output trees of any Build Sub Parts of the Build Part, e.g. not directly to the source or output tree of Build Part A or Build Part B.

It should be understood that this type of progression may continue for any number of build dependencies (e.g., there could be a Build Part D, a Build Part E, etc). Further, the progression need not be linear (e.g., one Build Part may depend on several Build Parts and a given Build Part may be the target of many dependencies.) However, in one embodiment, no cyclic dependencies are permitted and an error is generated if a circular reference is detected. In general, it should be understood that while the above description discusses various specific examples, a wide variety of modifications and/or additions may be made to these examples without departing from the disclosure's intended spirit and scope. While various XML files are discussed above, it should be understood that the techniques described herein are not limited to use with XML, but may alternatively be employed with any of a variety of other data structures and programming languages, including mark-up language, and other types of languages.

Further, it should be understood that at least some of the above-described techniques may be implemented in software, in hardware, or a combination thereof. A software implementation may include computer-executable instructions stored in a computer-readable storage medium, such as a volatile or persistent memory, a hard-disk, a compact disk (CD), or other tangible medium. A hardware implementation may include specially configured processors, logic circuits, application specific integrated circuits, and/or other types of hardware components. Further, a combined software/hardware implementation may include both computer-executable instructions stored in a computer-readable storage medium, as well as one or more hardware components, for example, processors, memories, etc. Accordingly, it should be understood that the above descriptions are meant to be taken only by way of example.

What is claimed is:

1. A method for building one or more buildable components of a deliverable software product, wherein at least some buildable components reference a sub component on which the respective buildable component depends, the method comprising:

receiving a selection of one or more collections of information that control how the one or more buildable components are processed when built;

retrieving at least one of source code and last known good builds of the one or more buildable components; and building the one or more buildable components indicated by the one or more collections of information by a process executing on one or more computer systems, wherein the building the one or more buildable components includes creating a structure associated with each respective buildable component of the one or more buildable components, and creating in the structure;

if the respective buildable component references a sub component on which the respective buildable component depends, a symbolic link to an output of a build of the sub component to provide access to the output of the sub component for use in building the respective buildable component, and if the respective buildable component is used by another buildable component, a symbolic link to an output of a build of the respective buildable component.

2. The method of claim 1, wherein the building the one or more buildable components creates the symbolic link to the output of the sub component on which the respective buildable component depends prior to building the respective buildable component.

3. The method of claim 1, wherein the building the one or more buildable components creates the symbolic link to the output of the respective buildable component subsequently or concurrently to building the respective buildable component.

4. The method of claim 1, wherein the structure associated with each buildable component is a Build Context that is embodied as a directory.

5. The method of claim 1, further comprising:
persistently maintaining the structure associated with each buildable component between multiple building processes.

6. The method of claim 1, further comprising:
specifying each of the one or more buildable components by a Build Part and each of the respective sub components by a Build Sub Part.

7. The method of claim 6, wherein each Build Part is an Extensible Markup Language (XML) element within a file.

8. The method of claim 7, wherein each Build Sub Part is an XML sub-element of one or more Build Parts.

9. The method of claim 1, wherein the one or more collections of information are one or more Build Strategies.

10. The method of claim 9, wherein each Build Strategy includes at least one of indications of where to find source files or and last known good builds, indications of which source files and last known good builds to retrieve, indications of what buildable components should be built, and indications of what should be done if a build of a particular buildable component fails.

11. The method of claim 9, wherein each Build Strategy is at least a portion of an Extensible Markup Language (XML) file.

12. The method of claim 1, wherein the retrieving comprises pulling a working copy of source code of the one or more buildable components from one or more Remote Repositories, and the method further comprises:
updating the source code; and
subsequent to building the one or more buildable components, posting the source code to the one or more Remote Repositories.

13. A non-transitory computer-readable storage medium containing executable program instructions, wherein the executable program instructions, when executed by one or more processors of a computer system, are operable to:
obtain an indication of one or more buildable components to be built, wherein at least some buildable components reference respective sub components on which they depend;
build the one or more buildable components, wherein to build the one or more buildable components a Build Context is created that is associated with each buildable component of the one or more buildable components and as part of the creation of the Build Context of a particular buildable component:

prior to building the particular buildable component, if the particular buildable component references a sub component on which the particular buildable component depends, a symbolic link to an output of a build of the sub component is created to provide access to the output of the sub component for use in building the particular buildable component, and if the particular buildable component is used by another buildable component, a symbolic link to an output of a build of the particular buildable component is created.

14. The non-transitory computer-readable medium of claim 13, wherein the symbolic link to an output of a build of the sub component provides access to one or more files created by the sub component, wherein the one or more files are used in building the particular buildable component.

15. The non-transitory computer-readable medium of claim 13, wherein the symbolic link to an output of a build of the particular buildable component provides an indication of where to find one or more files created by the particular buildable component.

16. The non-transitory computer-readable medium of claim 13, wherein the executable program instructions are further operable to:
specify each of the one or more buildable components by a Build Part and each of the respective sub components by a Build Sub Part, wherein each Build Part is embodied as an element and each Build Sub Part is embodied as a sub-element of one or more Build Parts.

17. The non-transitory computer-readable medium of claim 13, wherein the executable program instructions are further operable to:
obtain the indication of one or more buildable components to be built from one or more Build Strategies.

18. The non-transitory computer-readable medium of claim 13, wherein the executable program instructions are further operable to:
persistently maintain the Build Context associated with each buildable component between multiple building processes.

19. A computer system for building one or more Build Parts of a deliverable software product, the computer system comprising:
a computer having a processor and a memory, the computer maintaining:
one or more Build Part files that include Build Parts, wherein at least some Build Parts reference respective Build Sub Parts on which they depend, and wherein at least some Build Parts contain embedded build commands that when executed, build the respective Build Part;
one or more Build Contexts, wherein each Build Context is associated with a respective Build Part, and wherein each Build Context includes:
if the respective Build Part references a Build Sub Part on which the respective Build Part depends, a symbolic link to an output of a build of the Build Sub Part to provide access to the output of the Build Sub Part for use in building the respective Build Part, and
if the respective Build Part is used by another Build Part, a symbolic link to an output of a build of the respective Build Part;
one or more Build Strategy files that include information to control how the one or more Build Parts are processed when built; and a build orchestration process that, when executed, builds one or more particular Build Parts indicated by the one or more Build Strategy files according to the embedded build commands contained in the at least some Build Parts.

20. The computer system of claim 19, wherein each Build Context is embodied as a directory that is persistently maintained.

* * * * *

UNITED STATES PATENT AND TRADEMARK OFFICE
CERTIFICATE OF CORRECTION

PATENT NO. : 8,381,176 B1
APPLICATION NO. : 12/796316
DATED : February 19, 2013
INVENTOR(S) : Keith A. Bentley et al.

Page 1 of 1

It is certified that error appears in the above-identified patent and that said Letters Patent is hereby corrected as shown below:

In the Specification

In col. 3, line 45 should read:
build dependencies, that may illustrate some of the ~~is~~ novel In col. 4, line 60 should read:
one or more Build Parts that specify ~~is~~ individual buildable In col. 8, line 54 should read:
~~is~~ executed and to retrieve (i.e., "pull") source files and/or last In col. 11, line 38 should read:
files ~~or~~ and last known good builds, indications of which In col. 12, line 51 should read:
mands that, when executed, build the respective Build Signed and Sealed this
Twenty-fifth Day of June, 2013

Teresa Stanek Rea
*Acting Director of the United States Patent and Trademark Office*